(12) United States Patent
Chen et al.

(10) Patent No.: US 9,800,530 B2
(45) Date of Patent: Oct. 24, 2017

(54) MESSAGE DISPLAY METHOD AND DEVICE

(71) Applicant: Beijing Xiaomi Technology Co., Ltd., Beijing (CN)

(72) Inventors: Yinli Chen, Beijing (CN); Xinyu Liu, Beijing (CN); Jian Zeng, Beijing (CN)

(73) Assignee: Beijing Xiaomi Technology Co., Ltd., Beijing (CN)

( * ) Notice: Subject to any disclaimer, the term of this patent is extended or adjusted under 35 U.S.C. 154(b) by 1 day.

(21) Appl. No.: 13/949,451

(22) Filed: Jul. 24, 2013

(65) Prior Publication Data

US 2014/0059145 A1 Feb. 27, 2014

(30) Foreign Application Priority Data

Aug. 22, 2012 (CN) .......................... 2012 1 0301140

(51) Int. Cl.
*G06F 15/16* (2006.01)
*H04L 12/58* (2006.01)

(52) U.S. Cl.
CPC .................................. *H04L 51/16* (2013.01)

(58) Field of Classification Search
CPC . G06Q 10/107; H04L 51/16; H04M 1/72547; H04M 1/72552; G06F 3/04883
See application file for complete search history.

(56) References Cited

U.S. PATENT DOCUMENTS

| 8,261,231 | B1 * | 9/2012 | Hirsch et al. ................. 717/100 |
| 8,954,509 | B1 * | 2/2015 | Hodson et al. ............... 709/206 |
| 2003/0023675 | A1 * | 1/2003 | Ouchi ..................... G06Q 10/10 709/203 |
| 2004/0015547 | A1 | 1/2004 | Griffin et al. |
| 2009/0005011 | A1 | 1/2009 | Christie et al. |
| 2009/0177981 | A1 | 7/2009 | Christie et al. |
| 2010/0023871 | A1 * | 1/2010 | Bederson et al. ............ 715/745 |
| 2010/0070613 | A1 * | 3/2010 | Chen et al. .................... 709/219 |
| 2011/0231499 | A1 * | 9/2011 | Stovicek et al. .............. 709/206 |
| 2011/0264783 | A1 * | 10/2011 | Cundill et al. ................ 709/223 |
| 2011/0281596 | A1 * | 11/2011 | Balasubramaniam et al. ............................ 455/466 |

(Continued)

FOREIGN PATENT DOCUMENTS

| CN | 1859486 | 11/2006 |
| CN | 101365194 | 2/2009 |
| CN | 102438213 | 5/2012 |

(Continued)

OTHER PUBLICATIONS

Notification on Results of Estimation of Patentability of Invention, in counterpart Russian Application No. 2014153031/08(084810) (6 pages) and English translation thereof (5 pages).

(Continued)

*Primary Examiner* — Brian Whipple
*Assistant Examiner* — Gregory P Tolchinsky
(74) *Attorney, Agent, or Firm* — Finnegan, Henderson, Farabow, Garrett & Dunner LLP (57) ABSTRACT

A message display method for use in a device, including: determining a sending time and recipients of a mass message sent from the device by a user; and displaying the mass message on a conversation page of a separate conversation between the user and a first one of the recipients according to the sending time of the mass message.

14 Claims, 8 Drawing Sheets

(56) References Cited

U.S. PATENT DOCUMENTS

2011/0296320 A1    12/2011  Kwon et al.
2014/0019884 A1*  1/2014  Dinan ................ H04L 12/1813
                                                                             715/758

FOREIGN PATENT DOCUMENTS

| CN | 102497328 | 6/2012 |
|----|-----------|--------|
| CN | 102833408 | 12/2012 |
| JP | 2007-241668 A | 9/2007 |
| JP | 2010176207 A | 8/2010 |
| JP | 2010176634 A | 8/2010 |
| KR | 20110131467 | 12/2011 |
| RU | 2010151922 A | 6/2012 |
| WO | WO 2005/062184 A1 | 7/2005 |
| WO | WO 2006/083820 A2 | 8/2006 |
| WO | WO 2009/023483 | 2/2009 |
| WO | WO 2009/023483 A1 | 2/2009 |

OTHER PUBLICATIONS

European Search Report of Application No. 13830656.8, from the European Patent Office, mailed Jun. 2, 2015.

\* cited by examiner

MESSAGE DISPLAY METHOD AND DEVICE

RELATED APPLICATIONS

This application is based upon and claims the benefit of priority from Chinese Patent Application No. 201210301140.3, filed Aug. 22, 2012, the entire contents of which are incorporated herein by reference.

TECHNICAL FIELD

This disclosure generally relates to a message display method and device.

BACKGROUND

As a standard application in most cell phones, messaging software is an important tool for people to make contacts and deliver information. The messaging software generally provides a sender, i.e., a user of a cell phone, with the option to send a one-to-one message from the sender to one recipient, or to send a one-way mass message from the sender to multiple recipients simultaneously. For one-to-one messages between the sender and the same recipient, the cell phone conventionally displays the messages on a conversation page as a separate conversation between the sender and that recipient. That is to say, the separate conversation includes the exchanged messages between the user of the cell phone and one contact, e.g., a phone number.

Figure 1:
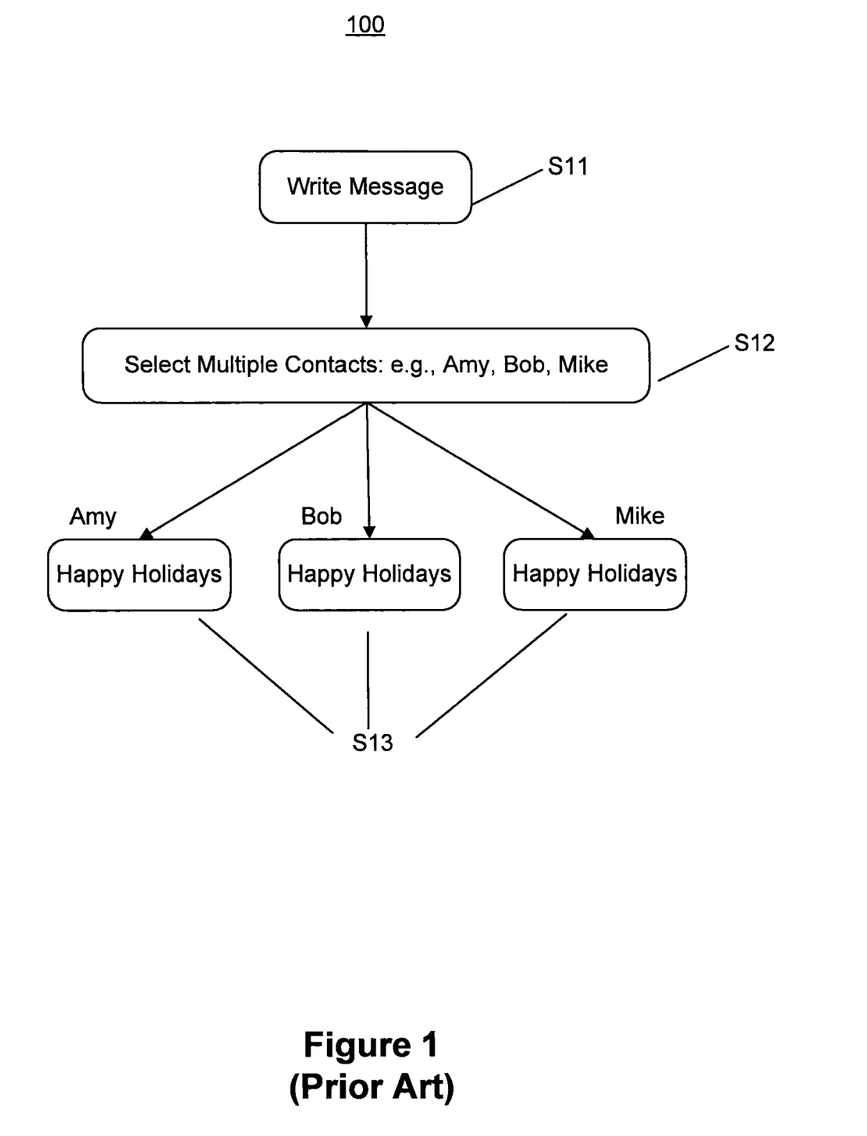
FIG. 1 illustrates a flowchart of a conventional process for a user to use a cell phone to send a mass message.

FIG. 1 illustrates a flowchart of a conventional process 100 for the user to use the cell phone to send a mass message. Referring to FIG. 1, in step S11, the sender writes the mass message, for example, "Happy Holidays." In step S12, the user selects multiple contacts as recipients to receive the mass message, such as Amy, Bob, and Mike. In step S13, the user sends the mass message to the multiple recipients at one time. The cell phone may display the sent mass message in either of first and second conventional methods. In the first conventional method, the cell phone displays one copy of the mass message sent from the user to the multiple recipients, and in the second conventional method, the cell phone separately displays multiple copies of the mass message each from the user to one of the recipients.

SUMMARY

According to a first aspect of the present disclosure, there is provided a message display method for use in a device, comprising: determining a sending time and recipients of a mass message sent from the device by a user; and displaying the mass message on a conversation page of a separate conversation between the user and a first one of the recipients according to the sending time of the mass message.

According to a second aspect of the present disclosure, there is provided a message display method for use in a device, comprising: determining a sending time and recipients of a mass message sent from the device by a user; determining that a received message is a first response from a first one of the recipients of the mass message, based on the sending time and the recipients of the mass message; and displaying the received message on a conversation page that displays the mass message.

According to a third aspect of the present disclosure, there is provided a device, comprising: a processor; and a memory including instructions executable by the processor; wherein the processor is configured to: determine a sending time and recipients of a mass message sent from the device by a user; and display the mass message on a conversation page of a separate conversation between the user and a first one of the recipients according to the sending time of the mass message.

According to a fourth aspect of the present disclosure, there is provided a message display device, comprising: a processor; and a memory including instructions executable by the processor; wherein the processor is configured to: determine a sending time and recipients of a mass message sent from the device by a user; determine a received message is a first response by a first one of the recipients of the mass message, based on the sending time and the recipients of the mass message; and display the received message on a conversation page that displays the mass message.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 2:
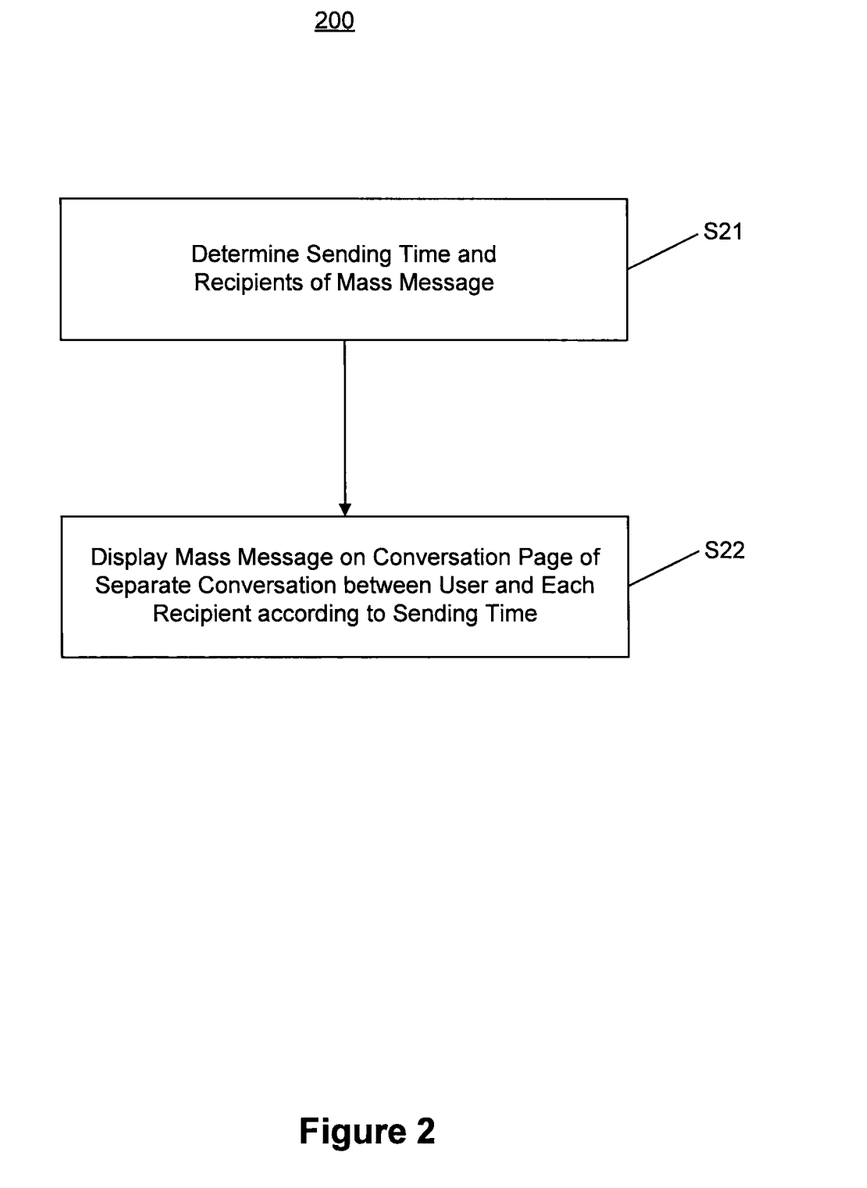
FIG. 2 illustrates a flowchart of a message display method for use in a device, according to an exemplary embodiment.

FIG. 2 illustrates a flowchart of a message display method 200 for use in a device, according to an exemplary embodiment. The device may be any device that is configured to send and receive messages, such as a cell phone, a tablet computer, a laptop, etc. Referring to FIG. 2, the method 200 includes step S21 and step S22.

In step S21, the device determines a sending time and recipients of a mass message sent from the device by a user, i.e., the sender, to multiple recipients. In step S22, the device displays the sent mass message on a conversation page of a separate conversation between the sender and each of the recipients according to the sending time.

In exemplary embodiments, the device inserts the sent mass message onto the conversation page of the separate conversation between the user and each of the recipients, thereby linking the mass message and the separate conversation with each of the recipients. As a result, the user can see the sent mass message on the conversation page of the separate conversation with a contact. This facilitates message inquiry by the user based on the contact and improves user experience.

In exemplary embodiments, if there is no existing conversation between the user and a first one of the recipients, the device may create a new conversation between the user and the first one of the recipients, to display the mass message. For example, when the user sends the mass message to 50 recipients, the mass message would be inserted into the 50 existing separate conversations each between the user and one of the recipients. However, if there is no existing separate conversation between the user and the first one of the recipients, the device may create the new separate conversation with the first one of the recipients, to display the mass message on a conversation page for the first one of the recipients.

Figure 3:
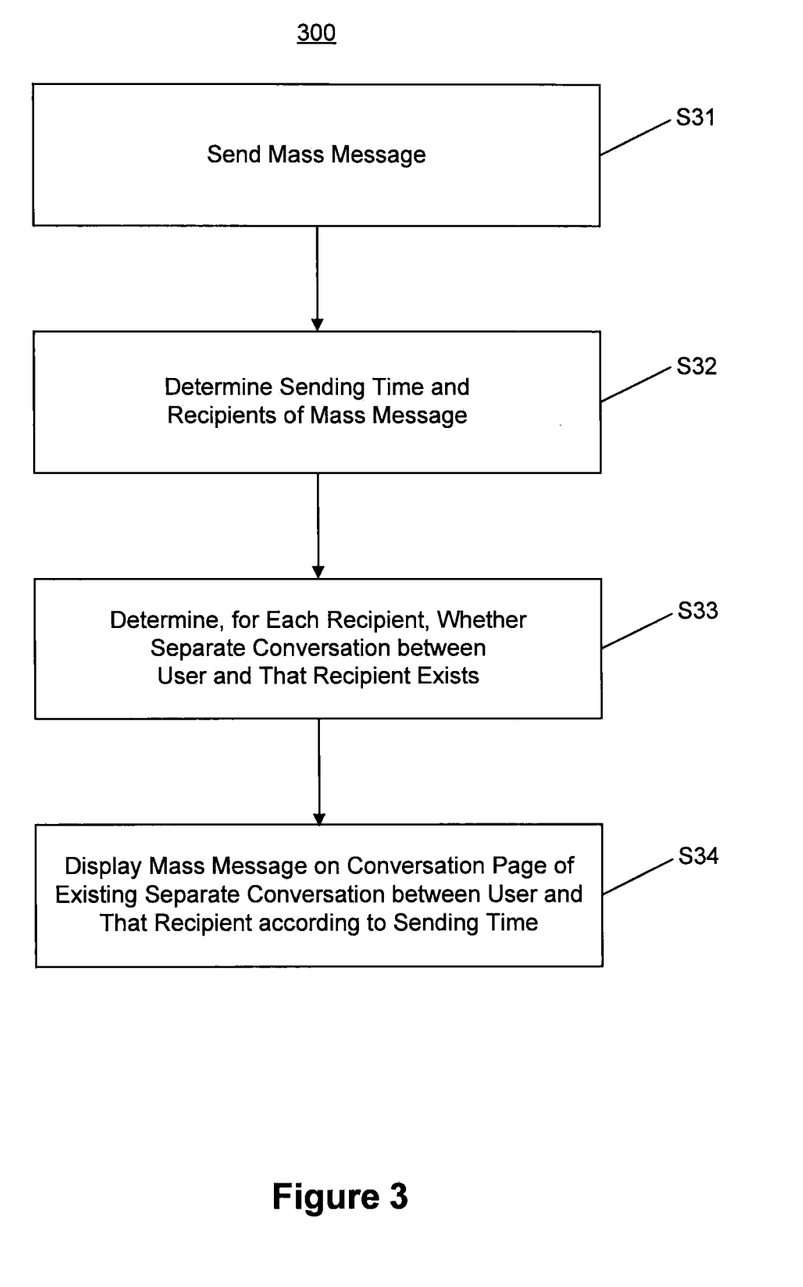
FIG. 3 illustrates a flowchart of a message display method for use in a device, according to an exemplary embodiment.

FIG. 3 illustrates a flowchart of a message display method 300 for use in the device, according to an exemplary embodiment. Referring to FIG. 3, the method 300 includes the following steps.

In step S31, the device sends a mass message. In step S32, the device determines a sending time and recipients of the sent mass message. In step S33, the device determines, for each of the recipients, whether a separate conversation between the user and that recipient exists. If the device determines that a separate conversation between the user and that recipient exists, in step S34, the device displays the mass message on a conversation page of the separate conversation between the user and that recipient according to the sending time of the mass message.

In exemplary embodiments, the conversation page of the separate conversation initially displays one or more messages exchanged between the user and the recipient of the mass message in time sequence. When the device displays the mass message on the conversation page of the separate conversation, the device inserts the mass message onto the conversation page according to the sending time of the mass message such that, after the insertion, the messages are still displayed in time sequence on the conversation page. In one exemplary embodiment, the device copies the mass message onto conversation pages of the respective separate conversations each between the user and one of the recipients for display.

Compared to the method 200 (FIG. 2), the method 300 includes an additional step of determining for each recipient whether a separate conversation between the user and that recipient exists. When the separate conversation exists, the device displays the mass message on the conversation page of the separate conversation. That is to say, the device displays the mass message on conversation pages of existing separate conversations between the user and ones of the recipients that have the existing conversations with the user. In exemplary embodiments, for a recipient of the mass message who has no existing separate conversation with the user, the device may not create a new separate conversation specially for displaying the mass message. For example, if the recipient of the mass message is not one that the user often contacts, the device may not create a new separate conversation specially for displaying the mass message sent to that recipient.

Figure 4:
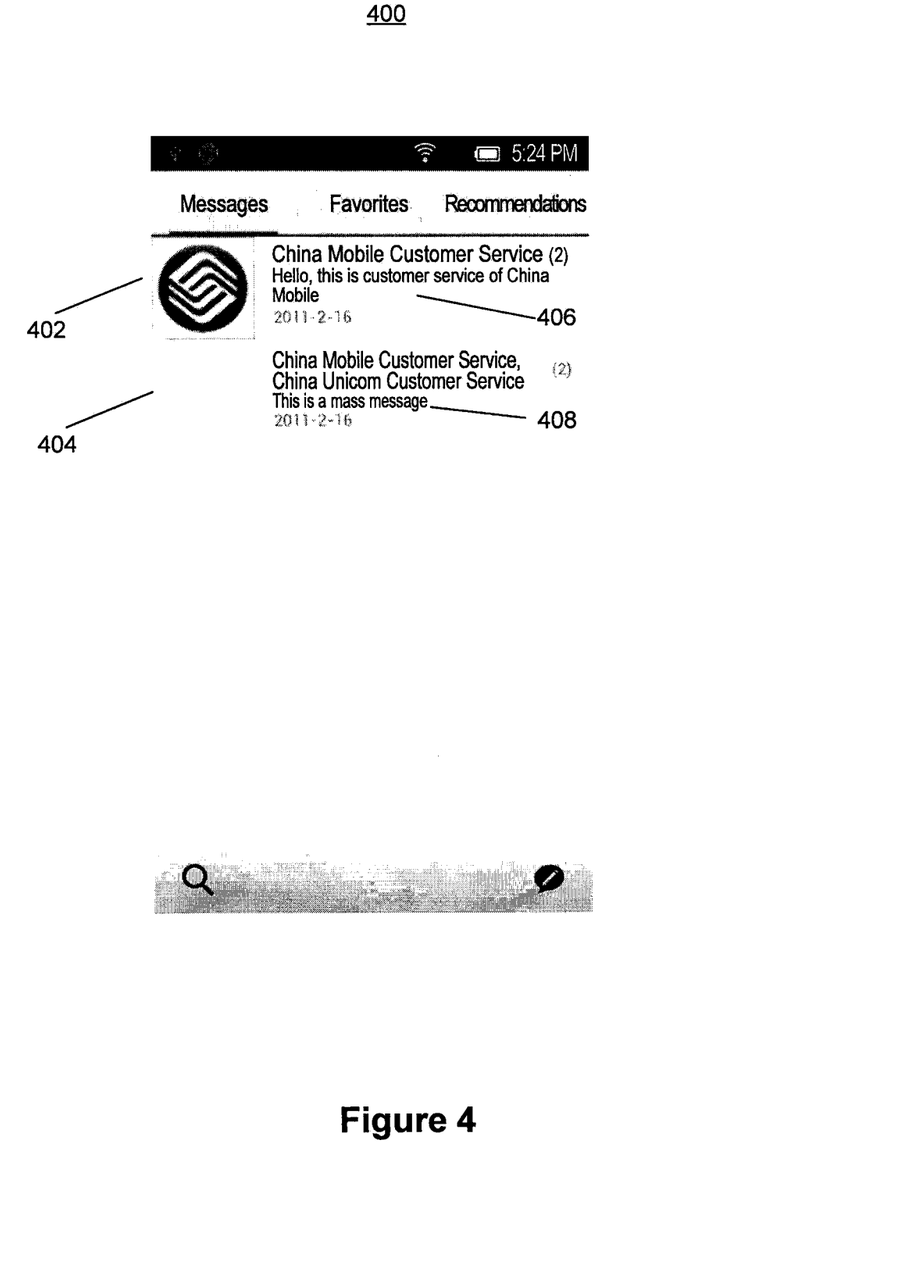
FIG. 4 illustrates a diagram of a message list displayed on a device, according to an exemplary embodiment.

FIG. 4 shows a diagram of a message list 400 displayed on the device, according to an exemplary embodiment. Referring to FIG. 4, the message list 400 lists a first conversation 402 and a second separate conversation 404. For example, the device receives a message 406 with the content "Hello, this is customer service of China Mobile" from customer service of China Mobile. Accordingly, the device lists the first conversation 402 between the user and the customer service of China Mobile for displaying the message 406. Also for example, the device sends a mass message 408 with the content, e.g., "This is a mass message," to multiple recipients including the customer service of China Mobile and customer service of China Unicorn. Accordingly, the device lists the second conversation 404 between the user and the recipients for displaying the mass message 408.

In exemplary embodiments, the device determines a sending time and the recipients of the mass message 408. The device also determines whether a separate conversation between the user and each of the recipients of the mass message 408 exists. In the illustrated embodiment, the device determines that a separate conversation between the user and the customer service of China Mobile, i.e., the first conversation 402, exists. Accordingly, the device inserts the mass message 408 onto a conversation page 500 (FIG. 5) of the existing separate conversation 402 between the user and the customer service of China Mobile according to the sending time of the mass message 408 for display. Additionally, the device determines that no existing separate conversation exists between the user and the customer service of China Unicorn and that China Unicorn is not a recipient that the user often contacts. Accordingly, the device does not create a new separate conversation between the user and the customer service of China Unicorn to display the mass message 408.

Figure 5:
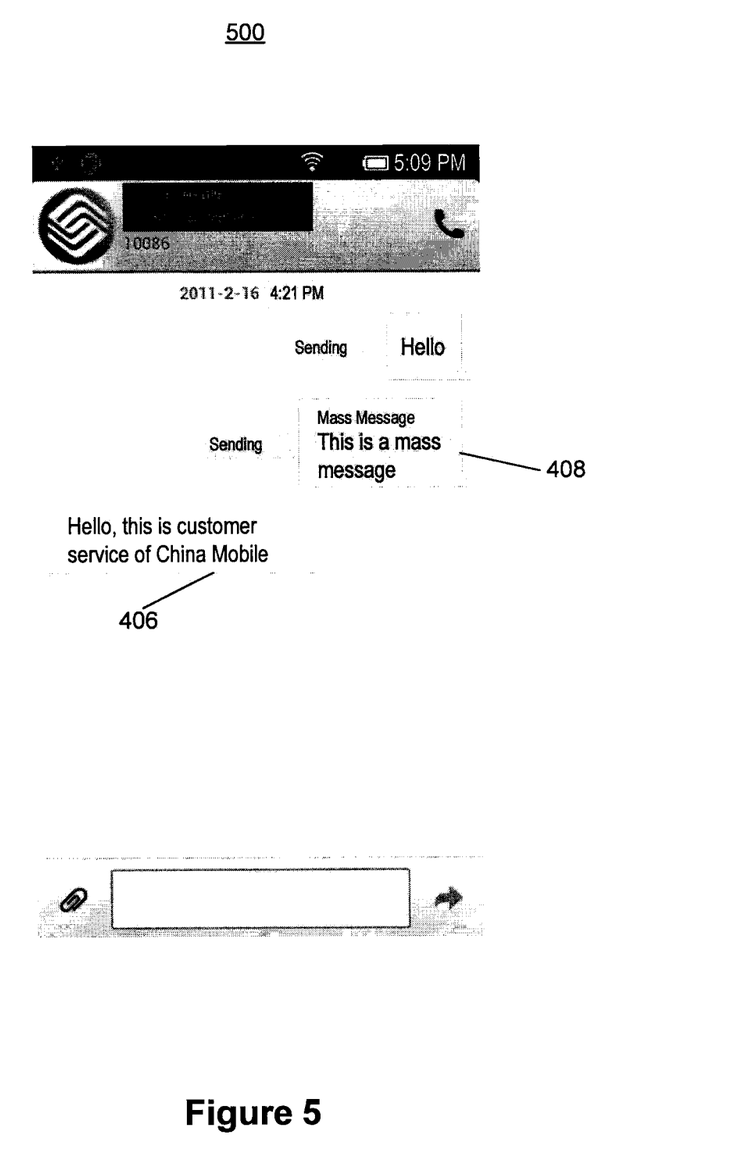
FIG. 5 illustrates a diagram of a conversation page displayed on a device, according to an exemplary embodiment.

FIG. 5 shows a diagram of the conversation page 500 displayed on the device, according to an exemplary embodiment. For example, when the first conversation 402 (FIG. 4) between the user and the customer service of China Mobile is selected for displaying content, the device displays the conversation page 500. Referring to FIG. 5, the device inserts the mass message 408 onto the conversation page 500 for display according to the sending time of the mass message 408.

In exemplary embodiments, the device may display a mass message on a conversation page of a separate conversation between the user and a recipient of the mass message through a link reference. When the device uses the link reference to display the mass message in the separate conversation between the user and the recipient, the device may further obtain a status of the mass message. In addition, the device may display the status of the mass message on the conversation page at the same time as the mass message is displayed. This allows the user to see the status of the mass message directly in the separate conversation. For example, the status of the mass message may include "sending," which indicates the device is sending the mass message, "sent," which indicates the device has already sent the mass message, "read," which indicates that the mass message has been read by the user, and "failed," which indicates the device failed to send the mass message.

In exemplary embodiments, when the device uses the link reference to display the mass message, an operation, e.g., a deletion operation, on the mass message displayed on the conversation page of the separate conversation or on the mass message displayed on an original conversation page, deletes both. In exemplary embodiments, the device highlights the mass message on the conversation page of the separate conversation to prevent a misoperation by the user. For example, the device may display the mass message on the conversation page of the separate conversation with a particular font color or background color for differentiation.

In exemplary embodiments, the device assigns a conversation identification (ID) to each conversation, and manages messages in each conversation based on the corresponding conversation ID. Typically, a conversation ID for a mass message is different in format from a conversation ID for a separate conversation. Therefore, the mass message can be identified by judging the conversation ID for the mass message, and may then be highlighted. In addition, because the conversation ID of the mass message can be recorded, an operation of skipping from a current conversation to the mass message can be realized.

Figure 6:
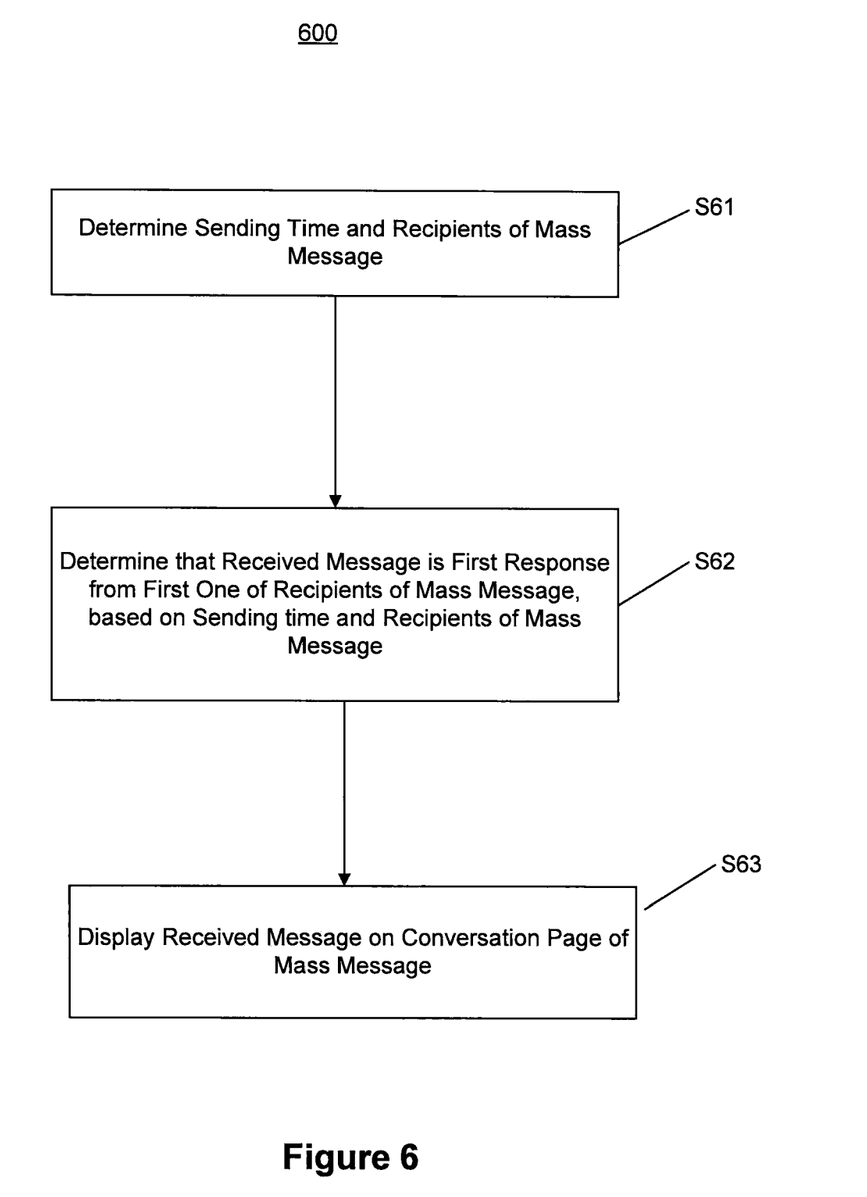
FIG. 6 illustrates a flowchart of a message display method, according to an exemplary embodiment.

FIG. 6 illustrates a flowchart of a message display method 600 for use in the device, according to an exemplary embodiment. Referring to FIG. 6, the method 600 includes the following steps.

In step S61, the device determines a sending time and recipients of a mass message sent by the user. In step S62, the device determines that a received message is a first response from a first one of the recipients of the mass message, based on the sending time and the recipients of the mass message. In step S63, the device displays the received message on a conversation page that displays the mass message. As the device repeats step S62 and step S63 for each of the recipients of the mass message, the first response from each of the recipients is displayed in time sequence on the conversation page that displays the mass message. This allows the user to see a reply status of the recipients of the mass message.

Figure 7:
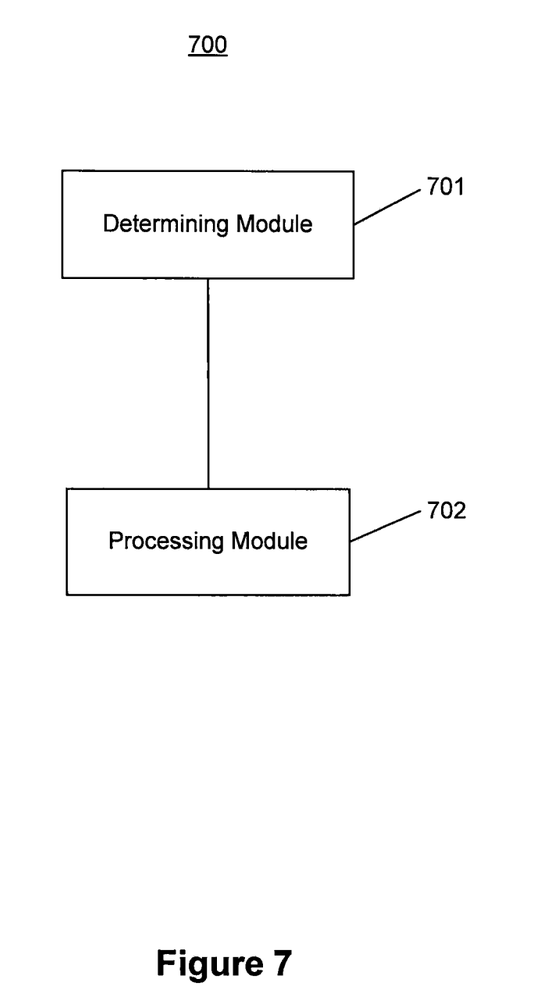
FIG. 7 illustrates a block diagram of a message display apparatus, according to an exemplary embodiment.

FIG. 7 illustrates a block diagram of a message display apparatus 700 used in the device, according to an exemplary embodiment. Referring to FIG. 7, the apparatus 700 includes a determining module 701 and a processing module 702.

In exemplary embodiments, the determining module 701 is configured to determine a sending time and recipients of a mass message sent by the user. The processing module 702 is configured to display the mass message on conversation pages of separate conversations each between the user and one of the recipients according to the sending time.

In addition, before displaying the mass message, the processing module 702 is also configured to determine, for each of the recipients, whether a separate conversation between the user and that recipient exists. If the processing module 702 determines that the separate conversation between the user and that recipient exists, the device displays the mass message on the conversation page of the separate conversation between the user and that recipient according to the sending time.

Additionally, the processing module 702 is configured to display the mass message on the conversation page of the separate conversation between the user and the recipient through a link reference. The processing module 702 is also configured to display a status of the mass message on the conversation page of the separate conversation between the user and the recipient. For example, the status may be any one of "sending," "sent," "read," and "failed," as described above. The processing module 702 is further configured to highlight the mass message on the conversation page of the separate conversation between the user and the recipient.

Figure 8:
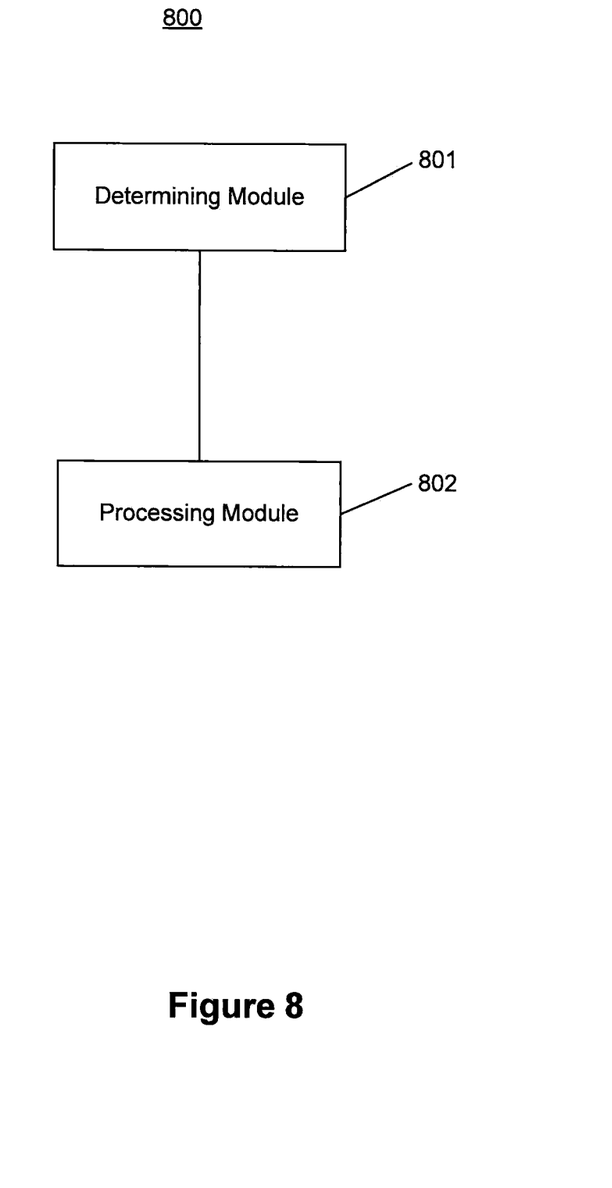
FIG. 8 illustrates a block diagram of a message display apparatus, according to an exemplary embodiment.

FIG. 8 illustrates a block diagram of a message display apparatus for use in the device, according to an exemplary embodiment. Referring to FIG. 8, the apparatus 800 includes a determining module 801 and a processing module 802.

In exemplary embodiments, the determining module 801 is configured to determine a sending time and recipients of a mass message sent by the user. The processing module 802 is configured to determine that a received message is a first response from a first one of the recipients of the mass message, based on the sending time and the recipients of the mass message, and to display the received message on a conversation page that displays the mass message.

In exemplary embodiments, the device may include one or more of the following components: a processor configured to execute program instructions to perform the above described message display methods, random access memory (RAM) and read only memory (ROM) configured to access and store information and program instructions, storage to store data and information, databases to store tables, lists, or other data structures, I/O devices that includes a touch screen, interfaces, an antenna, etc.

In exemplary embodiments, there is also provided a non-transitory, non-volatile readable storage medium including instructions, executable by the processor in the device, for performing the above-described message display methods.

One of ordinary skill in the art would understand that the above-described methods may be realized through software, hardware, or a combination of software and hardware. The software may be stored in the non-volatile storage medium (e.g., a CD-ROM, a U disk, a mobile hard disk, etc.). It may include certain commands for a piece of computer equipment (e.g., a PC, a server, or network equipment) to implement the above-described methods.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A message display method for use in a cell phone, comprising:

determining, by the cell phone, a sending time and a first plurality of recipients of a mass message sent from the cell phone by a user, the mass message being simultaneously sent to the first plurality of recipients and displayed on a first conversation page of a one-to-many conversation between the user and the first plurality of recipients; and displaying, by the cell phone, the mass message by inserting the mass message onto a second conversation page of a separate one-to-one conversation between the user and each of a second plurality of recipients of the first plurality of recipients according to the sending time of the mass message;

wherein when the mass message is displayed on the second conversation page through a link reference, the method further comprises:
in response to receiving a deleting operation on the mass message displayed on the second conversation page through the link reference, deleting the mass message displayed on the second conversation page through the link reference and the mass message displayed on the first conversation page of the one-to-many conversation.

2. The method of claim 1, wherein the displaying comprises:
displaying the mass message on the second conversation page, the second conversation page displaying at least one additional message between the user and a recipient of the second plurality of recipients.

3. The method of claim 1, wherein the displaying comprises:
determining whether the separate conversation between the user and a recipient of the first plurality of recipients exists; and
displaying, if it is determined that the separate conversation between the user and the recipient of the first plurality of recipients exists, the mass message on the second conversation page of the separate conversation between the user and the recipient of the first plurality of recipients according to the sending time of the mass message.

4. The method of claim 1, further comprising:
displaying, by the cell phone, a status of the mass message on the second conversation page of the separate conversation between the user and the one each of the second plurality of recipients, when the mass message is displayed on the second conversation page through the link reference.

5. The method of claim 4, wherein displaying the status comprises displaying at least one of a sending status indicating that the cell phone is sending the mass message, a sent status indicating that the cell phone has sent the mass message, a read status indicating that the mass message has been read by the user, or a failed status indicating that the cell phone fails to send the mass message.

6. The method of claim 1, further comprising:
highlighting, by the cell phone, the mass message on the second conversation page of the separate conversation between the user and one of the second plurality of recipients.

7. The method of claim 1, further comprising:
determining, by the cell phone, for each of the first plurality of recipients, that a received message is a first response from the recipient, based on the sending time and the first plurality of recipients of the mass message; and
displaying, by the cell phone, the first response from each of the first plurality of recipients on the first conversation page.

8. A cell phone, comprising:
a processor; and
a memory including instructions executable by the processor;
wherein the processor is configured to:

determine a sending time and a first plurality of recipients of a mass message sent from the cell phone by a user, the mass message being simultaneously sent to the first plurality of recipients and displayed on a first conversation page of a one-to-many conversation between the user and the first plurality of recipients; and
display the mass message by inserting the mass message onto a second conversation page of a separate one-to-one conversation between the user and each of a second plurality of recipients of the first plurality of recipients according to the sending time of the mass message;
wherein when the mass message is displayed on the second conversation page through a link reference, the processor is further configured to:
in response to receiving a deleting operation on the mass message displayed on the second conversation page through the link reference, delete the mass message displayed on the second conversation page through the link reference and the mass message displayed on the first conversation page of the one-to-many conversation.

9. The cell phone of claim 8, wherein the processor is further configured to display the mass message on the second conversation page, the second conversation page displaying at least one additional message between the user and a recipient of the second plurality of recipients.

10. The cell phone of claim 8, wherein the processor is further configured to determine whether the separate conversation between the user and a recipient of the first plurality of recipients exists and, if it is determined that the separate conversation between the user and the recipient of the first plurality of recipients exists, to display the mass message on the second conversation page of the separate conversation between the user and the recipient of the first plurality of recipients according to the sending time.

11. The cell phone of claim 8, wherein the processor is further configured to display a status of the mass message on the second conversation page of the separate conversation between the user and each of the second plurality of recipients, when the mass message is displayed on the second conversation page through the link reference.

12. The cell phone of claim 11, wherein the processor is further configured to display at least one of a sending status indicating that the cell phone is sending the mass message, a sent status indicating that the cell phone has sent the mass message, a read status indicating that the mass message has been read by the user, or a failed status indicating that the cell phone fails to send the mass message.

13. The cell phone of claim 8, wherein the processor is further configured to highlight the mass message on the second conversation page of the separate conversation between the user and one of the second plurality of recipients.

14. The cell phone of claim 8, wherein the processor is further configured to:
determine, for each of the first plurality of recipients, a received message is a first response from the recipient, based on the sending time and the first plurality of recipients of the mass message; and
display the first response from each of the first plurality of recipients on the first conversation page.

* * * * *